D. FERGUS.
Steam-Injector.

No. 162,368.  Patented April 20, 1875.

Witnesses:  Inventor
T. F. Hartman  David Fergus
J. R. Connolly  By Connolly Bros.
 Attorneys

UNITED STATES PATENT OFFICE.

DAVID FERGUS, OF PHILADELPHIA, PENNSYLVANIA.

IMPROVEMENT IN STEAM-INJECTORS.

Specification forming part of Letters Patent No. 162,368, dated April 20, 1875; application filed October 3, 1874.

*To all whom it may concern:*

Be it known that I, DAVID FERGUS, of Philadelphia, in the county of Philadelphia and State of Pennsylvania, have invented a certain new and useful Improvement in Steam-Injectors; and I do hereby declare the following to be a full, clear, and exact description of the invention, such as will enable others skilled in the art to which it pertains to make and use it, reference being had to the accompanying drawings, which form a part of this specification, in which—

Figure 1:
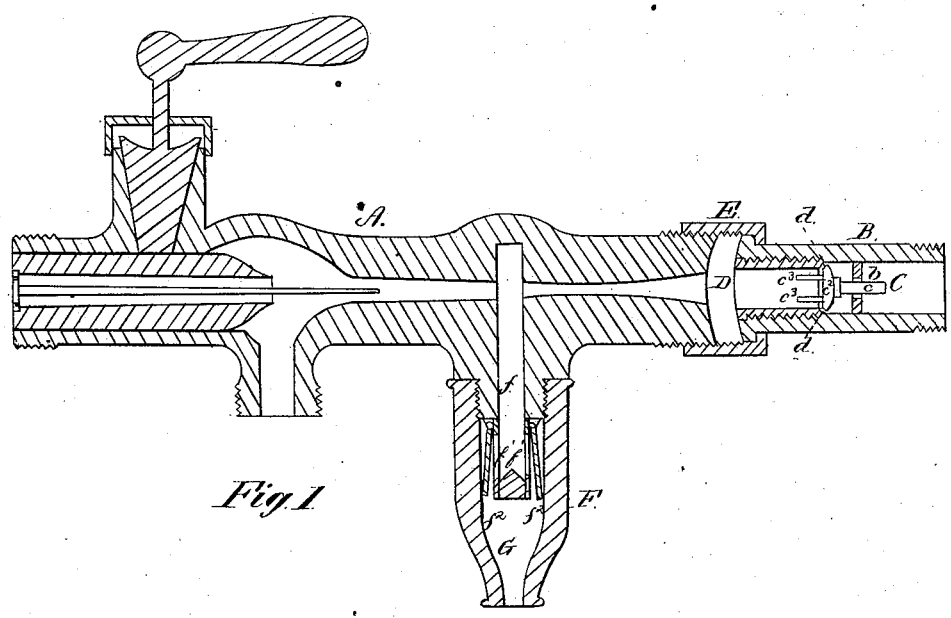
Figure 2:
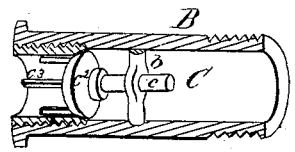

Figure 1 is a vertical central section, and Fig. 2 a perspective view of a detail.

The object of my invention is to simplify the construction and lessen the cost of steam-boiler injectors, and also to do away with the noise usually made at the overflow-pipe when a vacuum has been created.

My invention accordingly consists, first, in providing a check-valve within the swivel; second, in the provision of flat valves in the overflow-pipe.

Referring to the accompanying drawing, A shows an injector, the body of which is constructed substantially in accordance with the injector patented May 26, 1874, by Ryner, Farley, and Fergus. B represents a swivel, by which the injector is usually connected with the boiler. $b$ is a bridge, located within the swivel B, and forming a guide or support for the rod or stem of the sliding check-valve C. Said check-valve is formed of the stem $c$, shoulder $c^1$, double-cone body $c^2$, and prongs $c^3$. D represents a bush screwed into the swivel B and forming a seat at $d$ for the valve C. E is the nut by which the swivel and injector are held together.

When the injector is in operation the check C will be forced back until its shoulder $c^1$ impinges upon the bridge $b$, allowing the water to pass between the prongs $c^3$ into the boiler. When, however, the injector is not feeding, the boiler pressure will force the valve C to its seat $d$, cutting off all communication between the boiler and injector. The injector may thus at any time be removed for repairs or other cause, the swivel and check remaining in position in the boiler, shutting off the pressure of the latter.

F shows the overflow-pipe, within which is a hollow stem, $f$, having lateral openings $f^1 f^1$, closed by flap-valves $f^2 f^2$. The end of the stem $f$ is closed by a plug, G, beveled at the openings $f^1 f^1$ so as to form a $\wedge$-ridge for the purpose of evenly dividing the overflow-water, so as to allow it to escape easily from the overflow-pipe, the valve openings being insufficient in size to allow all the water to pass through one with the requisite facility in case of a large overflow.

As soon as a vacuum is created by the injector the overflow ceases and a suction of air through the openings $f^1 f^1$ begins. The valves $f^2 f^2$ at once close, shutting off the suction, and thereby preventing the disagreeable noise heretofore produced.

I have illustrated my improvements, as applied to the patent of Ryner, Farley, and Fergus, above mentioned, but they are equally applicable to all other injectors with which I am acquainted.

Though I have described a somewhat peculiar construction of the check C, I do not limit myself thereto, but reserve the right to substitute any other valve which may answer the purpose in view, this part of my invention covering broadly the employment of a check-valve within a swivel in any and all cases whatever.

I am well aware that, broadly considered, a check-valve, in combination with an injector, is not new; that, for instance, a check-valve has been used in the body of injectors in one case, and in a globe screwed to the swivel in the other. But in the first case, *i. e.*, where the check is in the body of the injector, when the latter is unscrewed from the boiler, for repair or other cause, leakage will occur at the swivel. By placing the check, however, within the swivel, the injector body may be unscrewed from the boiler without occasioning any leakage of the latter. So, too, in the second case, where the check is placed within the globe, it requires an extra part, viz, the globe, which, by my construction, is avoided, thereby effecting an economical result.

I am also aware that the employment of a valve in the overflow-pipe of an injector is not new, *per se*. Consequently, I limit my claim to the peculiar valve shown, whereby new and improved results are obtained. I employ the flap-valves $f^2 f^2$, in preference to others, because while operating effectually to prevent suction, they offer no obstruction to the escape of water, opening easily from the inside, and are not at all liable to get out of order. This form of valve also allows a division of the water-current, issuing in two streams, without obstruction, through the lateral openings in the hollow plug to which said valves are attached.

What I claim as my invention is—

1. In combination with a swivel, B, a check-valve located within such swivel, substantially as shown and described.

2. The hollow stem $f$, located in the overflow-pipe of a steam-boiler injector, provided with a flap-valve or valves $f^2 f^2$, for closing the lateral openings $f^1$, substantially as shown and described.

3. In combination with the hollow stem $f$, located in the overflow-pipe of a steam-boiler injector, the beveled plug G, for dividing the overflow, substantially as shown and described.

In testimony that I claim the foregoing I have hereunto set my hand this 22d day of September, 1874.

DAVID FERGUS.

Witnesses:
FRANK HARTMAN,
JNO. A. BELL.